(No Model.)

J. P. CASEY.
ELECTRIC ELEVATOR.

No. 572,525.  Patented Dec. 8, 1896.

WITNESSES:
Henry Drury
Wm. L. Evans

INVENTOR:
John P. Casey
By his atty

UNITED STATES PATENT OFFICE.

JOHN P. CASEY, OF BLOOMSBURG, PENNSYLVANIA.

ELECTRIC ELEVATOR.

SPECIFICATION forming part of Letters Patent No. 572,525, dated December 8, 1896.

Application filed August 23, 1894. Serial No. 521,089. (No model.)

*To all whom it may concern:*

Be it known that I, JOHN P. CASEY, of the city of Bloomsburg, in the county of Columbia and State of Pennsylvania, have invented an Improvement in Electric Elevators, of which the following is a specification.

My invention has reference to electric elevators; and it consists of certain improvements which are fully set forth in the following specification and shown in the accompanying drawings, which form a part thereof.

More specifically my improvements comprehend certain devices for automatically controlling the current supplied to the electric elevator in case the cable should break or become slack. Frequently in elevators the cage will become caught while descending, so that the cable slackens. If the slack cable should be very great and the cage fall, it is liable to snap the cable, with possible injury to the occupants. If the extent of the slack cable be very slight, the falling of the cage of the short distance possible will in most cases not be injurious to the occupants.

My invention comprehends certain improvements to prevent excessive slack in the cable, and to accomplish this I provide suitable switch devices to automatically open the electric circuit which supplies current to the electric motor the instant an appreciable slack in the cable exists.

My invention will be better understood by reference to the accompanying drawings, in which—

Figure 1:
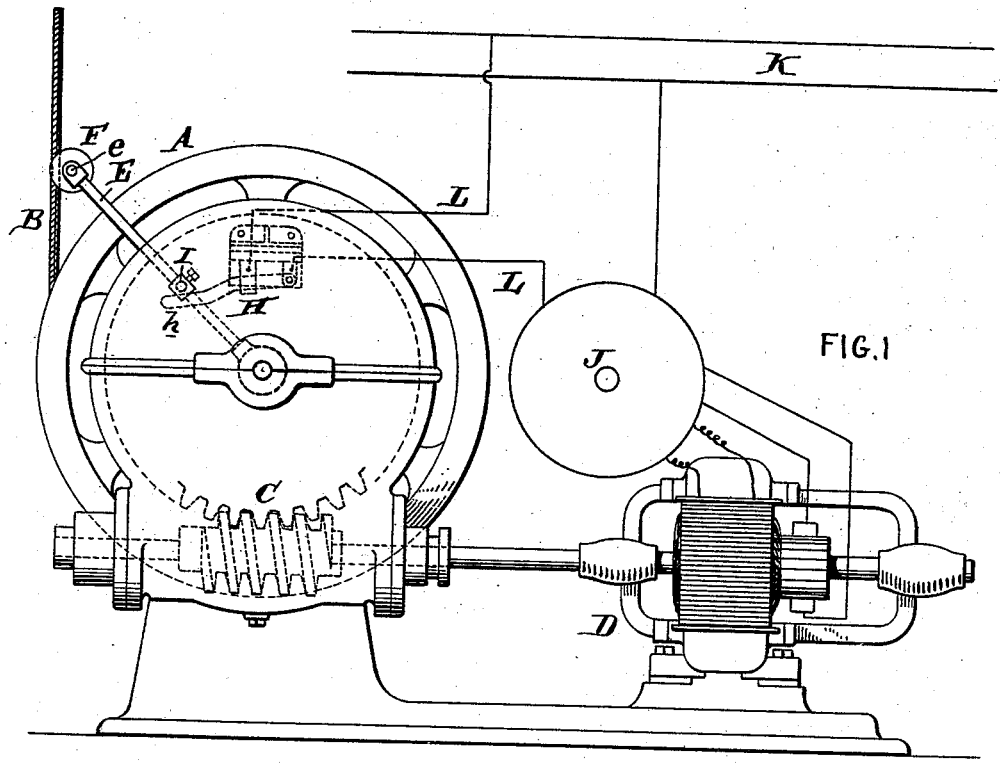
Figure 2:
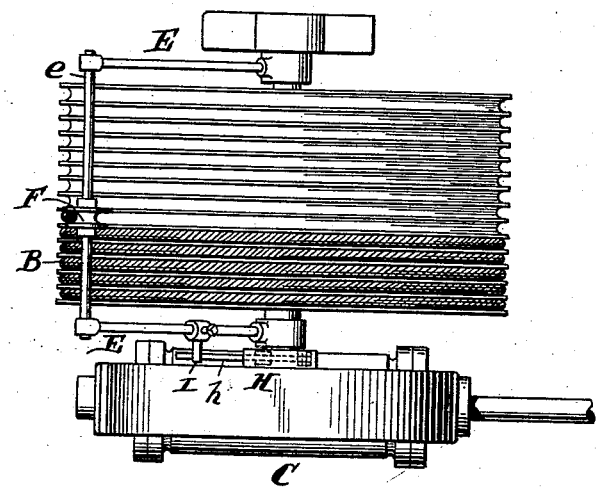

Figure 1 is a side elevation of an electric elevator embodying my improvements, and Fig. 2 is a plan view of a portion of the same.

A is the winding-drum and winds up or pays out the cable B in the usual manner. The winding-drum is operated by a worm and worm-wheel gearing C, the worm of which is driven by an electric motor D.

J represents the current-controller, of any suitable construction, for controlling the current delivered to the motor and for reversing its direction of rotation. Any suitable construction heretofore employed may be used in connection with my improvements.

L is the motor-circuit leading from the mains K and including a circuit-breaking switch H, the main switch J, and the electric motor D. The switch J is adapted to control the operation of the motor, while the switch H is adapted to open the motor-circuit only when there is danger from a slack or broken cable. This switch H is provided with a lever or handle $h$, which may be pressed upon to open the circuit by a pin I, carried upon a pivoted frame E. The frame E has a cross bar or shaft $e$, upon which the grooved pulley F freely revolves. The pulley F rests against the cable B and supports thereby the frame E in an inclined position. The pulley F traverses the rod or shaft $e$ as the cable B is wound or unwound from the drum D. If the cable B should be broken or become slack, the frame E would instantly drop, and thus would cause the pin I to strike the lever $h$ and quickly and automatically open the motor-circuit independently of any operation of the operator. This would cause the motor to stop rotating, and this action would be more quickly accomplished by the usual electromagnetically-operated brakes, which are employed in electric elevators, the said brakes being automatically applied simultaneously with the cutting of the motor out of circuit. It will thus be seen that the motor is not permitted to keep on rotating and unwinding the cable in case the car shall become obstructed while descending, and consequently the extent of the slackness of the cable is limited, and therefore the possible fall of the cage is in a great measure reduced.

I have shown the cut-out switch H as a single-pole switch; but it is evident that a double-pole switch may be employed, or, in fact, any class of cut-out switch found upon the market may be used which is adapted to the purpose. My invention comprehends, broadly, any switch devices automatically controlled by the elevating-cable to cut the motor out of circuit upon the said cable becoming slack from any cause, whether the cable is ruptured or not.

I do not confine myself to the details of construction herein illustrated, as they may be modified in various ways without departing from the principles of my invention.

Having now described my invention, what I claim as new, and desire to secure by Letters Patent, is—

In an electric elevator, the combination of a winding-drum, a hoisting-cable lifting a cage and normally under tension, an electric motor to operate the winding-drum, a motor-circuit, a regulator to control the operation of the motor for normal work, a stationary electric cut-out switch having a pivoted circuit-breaking arm for opening the motor-circuit in case of accident with great rapidity, a pivoted lever having a grooved roller-guide resting against the hoisting-cable and normally held out of contact with the switch-arm but adapted upon breaking of the cable or of its becoming slack to fall and strike the switch causing it to open the motor-circuit quickly.

In testimony of which invention I have hereunto set my hand.

JOHN P. CASEY.

Witnesses:
JOHN L. WOODS,
S. C. BROWN.